(12) United States Patent
Frankel

(10) Patent No.: US 7,649,645 B2
(45) Date of Patent: Jan. 19, 2010

(54) METHOD OF ORDERING JOB QUEUE OF MARKING SYSTEMS

(75) Inventor: Neil A. Frankel, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 893 days.

(21) Appl. No.: 11/157,598

(22) Filed: Jun. 21, 2005

(65) Prior Publication Data

US 2006/0285159 A1    Dec. 21, 2006

(51) Int. Cl.
*G06F 3/12* (2006.01)
*G06F 3/00* (2006.01)

(52) U.S. Cl. .................. 358/1.16; 358/1.9; 358/1.13; 358/1.15; 358/527; 710/39; 710/54; 399/23; 399/24; 399/27; 399/28; 399/82; 399/85

(58) Field of Classification Search .................. 358/1.1, 358/1.15, 1.13, 1.16, 1.9, 1.8, 527; 399/23, 399/24, 27, 28, 82, 85; 400/61, 62, 70, 76
See application file for complete search history.

(56) References Cited

U.S. PATENT DOCUMENTS

| | | | |
|---|---|---|---|
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,080,340 A | 1/1992 | Hacknauer et al. |
| 5,095,342 A | 3/1992 | Farrell et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Mark K Zimmerman
*Assistant Examiner*—Miya J Cato
(74) *Attorney, Agent, or Firm*—Fay Sharpe LLP

(57) ABSTRACT

A method of ordering a job queue includes providing a marking system that includes a first marking engine and a storage device storing first and second print jobs in queue. The first marking engine includes first and second metrics. The method includes determining a present state value of the first and second metrics for the first marking engine, and estimating an incremental depletion value of the first and second metrics of the first and second print jobs. The method further includes comparing the incremental depletion value of the first and second metrics, respectively, with the present state value of the first and second metrics for the first marking engine. The method also includes ordering the first and second print jobs in the storage device based at least partially on the comparison. A system is also discussed.

9 Claims, 7 Drawing Sheets

U.S. PATENT DOCUMENTS

| | | | |
|---|---|---|---|
| 5,596,416 A * | 1/1997 | Barry et al. | 358/296 |
| 5,629,762 A | 5/1997 | Mahoney et al. | |
| 5,710,968 A | 1/1998 | Clark et al. | |
| 5,778,377 A | 7/1998 | Marlin et al. | |
| 5,884,910 A | 3/1999 | Mandel | |
| 5,995,721 A | 11/1999 | Rourke et al. | |
| 6,059,284 A | 5/2000 | Wolf et al. | |
| 6,125,248 A | 9/2000 | Moser | |
| 6,241,242 B1 | 6/2001 | Munro | |
| 6,266,493 B1 * | 7/2001 | Farrell et al. | 399/24 |
| 6,297,886 B1 | 10/2001 | Cornell | |
| 6,341,773 B1 | 1/2002 | Aprato et al. | |
| 6,384,918 B1 | 5/2002 | Hubble, III et al. | |
| 6,433,884 B1 * | 8/2002 | Kawakami | 358/1.15 |
| 6,450,711 B1 | 9/2002 | Conrow | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,606,165 B1 * | 8/2003 | Barry et al. | 358/1.9 |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,738,587 B1 * | 5/2004 | Hoene et al. | 399/77 |
| 6,819,906 B1 | 11/2004 | Herrmann et al. | |
| 6,915,090 B2 * | 7/2005 | Fukaya | 399/85 |
| 2002/0078012 A1 | 6/2002 | Ryan et al. | |
| 2002/0103559 A1 | 8/2002 | Gartstein | |
| 2003/0077095 A1 | 4/2003 | Conrow | |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0247365 A1 | 12/2004 | Lofthus et al. | |
| 2005/0141007 A1 * | 6/2005 | Shirai et al. | 358/1.13 |
| 2005/0275875 A1 * | 12/2005 | Jennings | 358/1.15 |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/002,528, filed Dec. 2, 2004, Lofthus et al.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, Mar. 25, 2005, Clark et al.
U.S. Appl. No. 11/090,498, Mar. 25, 2005, Clark.
U.S. Appl. No. 11/090,502, Mar. 25, 2005, Mongeon.
U.S. Appl. No. 11/095,378, Mar. 31, 2005, Moore et al.
U.S. Appl. No. 11/094,998, Mar. 31, 2005, Moore et al.
U.S. Appl. No. 11/094,864, Mar. 31, 2005, de Jong et al.
U.S. Appl. No. 11/095,872, Mar. 31, 2005, Julien et al.
U.S. Appl. No. 11/102,355, Apr. 8, 2005, Fromherz et al.
U.S. Appl. No. 11/084,280, Mar. 18, 2005, Mizes.
U.S. Appl. No. 11/109,566, Apr. 19, 2005, Mandel et al.
U.S. Appl. No. 11/109,558, Apr. 19, 2005, Furst et al.
U.S. Appl. No. 11/109,996, Apr. 20, 2005, Mongeon et al.
U.S. Appl. No. 11/093,229, Mar. 29, 2005, Julien.
U.S. Appl. No. 11/102,899, Apr. 8, 2005, Crawford et al.
U.S. Appl. No. 11/102,910, Apr. 8, 2005, Crawford et al.
U.S. Appl. No. 11/115,766, Apr. 27, 2005, Grace.
U.S. Appl. No. 11/102,332, Apr. 8, 2005, Hindi et al.
U.S. Appl. No. 11/136,959, May 25, 2005, German et al.
U.S. Appl. No. 11/136,821, May 25, 2005, Robinson.
U.S. Appl. No. 11/122,420, May 5, 2005, Richards.
U.S. Appl. No. 11/137,634, May 25, 2005, Lofthus et al.
U.S. Appl. No. 11/137,251, May 25, 2005, Lofthus et al.
U.S. Appl. No. 11/137,273, filed May 25, 2005, Anderson et al.

* cited by examiner

METHOD OF ORDERING JOB QUEUE OF MARKING SYSTEMS

BACKGROUND

The present exemplary embodiments broadly relate to the art of marking systems and, more particularly, to a method and system for ordering a job queue of a marking system. Such embodiments find particular application and use in association with maximizing productivity and utilization of redundant capabilities of multi-engine marking systems, and is discussed herein with particular reference thereto. However, it is to be understood that the present exemplary embodiments are capable of broad use and are amenable for use in other applications and environments, including single-engine marking systems.

It is well understood that image marking systems of a great variety of types, kinds and configurations can receive, process and output a significant quantity of print jobs over the course of a normal period of operation. As such, it is common for numerous print jobs to be in queue for processing by an associated marking system at any given time. Additionally, many such image marking systems include a memory or storage component that receives and holds the print jobs and/or data associated therewith prior to the same being released for processing by the image marking system. In some alternate arrangements, such a job processing queue can be provided by an associated computer system or network.

Known printing systems typically process print jobs from the job queue in the order that the same are received by the printing system. Normally, this is done without taking into consideration the state of the printing system itself and/or the components thereof. As a result, the printing system might be incapable of outputting certain print jobs in the print queue due to a depleted state or condition of one or more of the system components, though the printing system is not normally aware of this potential problem. That is, known printing systems do not consider the depleted functions or states of the system and/or its components in deciding which print job to output next. Rather, known printing systems typically operate on a first-in, first-out basis.

It will be appreciated, then, that the print queue of a printing system could, at any given time, be storing some print jobs that can be output by the system, other print jobs that cannot be run at all by the printing system, and still others that can be output by the printing system but which will cause the system to operate in an inefficient manner. Because typical printing systems do not consider the depletion of function of its components, such systems cannot sort or otherwise determine which of the print jobs pending within the job queue can be run at a normal or high efficiency, which print jobs can be run, but at a lower level of efficiency, and which print jobs cannot be run at all. Thus, print job throughput is not maximized based upon the state of the printing system, and undue delays and reduced performance can result.

As an example, consider a color printer having a low black toner level and numerous print jobs stored in a print queue waiting to be output by the color printer. Known printing systems will likely output an earlier-received, multi-page, black-and-white print job before processing any later-received, multi-page, color print jobs, because no consideration is normally paid to the operational status or depletion level of the printing system and/or its components. Consider, then, that the color printer processes and outputs the earlier-received, black-and-white print job first, and as a result the black toner becomes fully depleted. One disadvantage of such an arrangement is that in many cases this fully depleted condition will occur during the print job itself. This will cause the print job to halt and likely cause the printing system enter a non-functional state. Another disadvantage is that the other pending print jobs, such as the numerous color print jobs, might have only required some minimal amount of black toner. Thus, the depleted black toner level might have been sufficient to produce these print jobs. Unfortunately, the printing system will by this point either be in a non-operational condition or the black toner level will be sufficiently depleted that the remaining print jobs can no longer be produced and, thus, remain in the queue until the printer is restored to an operable condition.

Recently, image marking systems that include and/or utilize multiple marking engines have been developed, and can provide increases in efficiency and performance over single engine marking systems. Such image marking systems are referred to by a variety of names, such as "tandem engine" machines and/or systems, "parallel printers", "output merger" systems, "interposer" systems, and "cluster printing" systems, for example. These types of systems can take a wide variety of forms and/or configurations. However, each of these types of systems utilizes multiple marking engines to produce printed output.

There are numerous benefits and advantages of using an image marking system that includes or utilizes multiple marking engines. Such benefits and advantages can include higher output rates, greater efficiency and increased production capabilities for example. Another advantage of multi-engine systems, which is not attainable with single engine marking systems, is the ability of a printing system to route a print job or portion thereof away from a marking engine that is not fully operational to a different marking engine that is suitably operational so that the print job can be completed. Basically, multiple engine marking systems will often have redundant capabilities, often including two or more marking engines that have a particular output capability. Though there may be some reduction in performance and/or efficiency by diverting a portion of a print job from a not fully operational engine to a fully operational engine, the marking system can continue to operate and produce output by taking advantage of these redundant capabilities.

One difficulty with such multiple engine image marking systems, however, is that known processes and algorithms for organizing and re-ordering the print queue of single engine marking systems are generally unsuited for use in multiple engine marking systems. This is due, at least in part, to the inability of these processes and algorithms to take advantage of the redundant capabilities of multiple marking engine systems. What's more, processes and/or algorithms associated with the operation of multiple engine marking systems are often directed toward taking full advantage of the parallel processing capabilities of these systems, and rely on the increased capacity of the multiple marking engines to provide the desired increases in performance. That is, these processes and/or algorithms tend to focus on the immediate production of the print job at hand, and typically do not provide for optimizing or otherwise re-ordering or organizing the jobs in the print queue.

BRIEF DESCRIPTION

According to aspects illustrated herein, there is provided a method of ordering a job queue that includes providing a marking system including a first marking engine and a storage device storing first and second print jobs in queue. The first marking engine includes first and second metrics. The method includes determining a present state value of the first and second metrics for the first marking engine, and estimating an incremental depletion value of the first and second metrics for the first and second print jobs. The method also includes comparing the incremental depletion value of the first and second metrics for the first and second print jobs respectively with the present state value of the first and second metrics for the first marking engine. The method further includes ordering the first and second print jobs in the storage device based at least partially on the comparison.

According to other aspects illustrated herein, there is provided a method of ordering a queue of print jobs of a marking system that includes a plurality of marking engines each having a plurality of metrics associated therewith. The method includes determining a present state value of at least one metric selected from the plurality of metrics for each marking engine. The method also includes estimating an incremental depletion value for the at least one selected metric for each print job. The method further includes comparing the incremental depletion value for the at least one selected metric with the present state value of the at least one selected metric of each marking engine, and ordering the queue of print jobs based at least partially on the comparison.

According to further aspects illustrated herein, there is provided a printing system that includes a media supply, a media outlet spaced from the media supply and a media pathway extending between the media supply and the media outlet. A plurality of marking engines is in communication with the media pathway, and the marking engines include a plurality of operational metrics. A storage device is adapted to receive and store a plurality of print jobs in queue for the marking engines, and a control system is in communication with the storage device and the marking engines. The control system is operative to determine a present state value of one or more of the metrics of the marking engines, and estimate an incremental depletion value of the one or more metrics for each of the print jobs. The control system is also operative to compare the present state value of the one or more metrics of the marking engines with the incremental depletion value for each of the print jobs. Furthermore, the control system is operative to order the print jobs, and release at least one of the ordered print jobs from the storage device to one or more of the marking engines.

DETAILED DESCRIPTION

Figure 1:
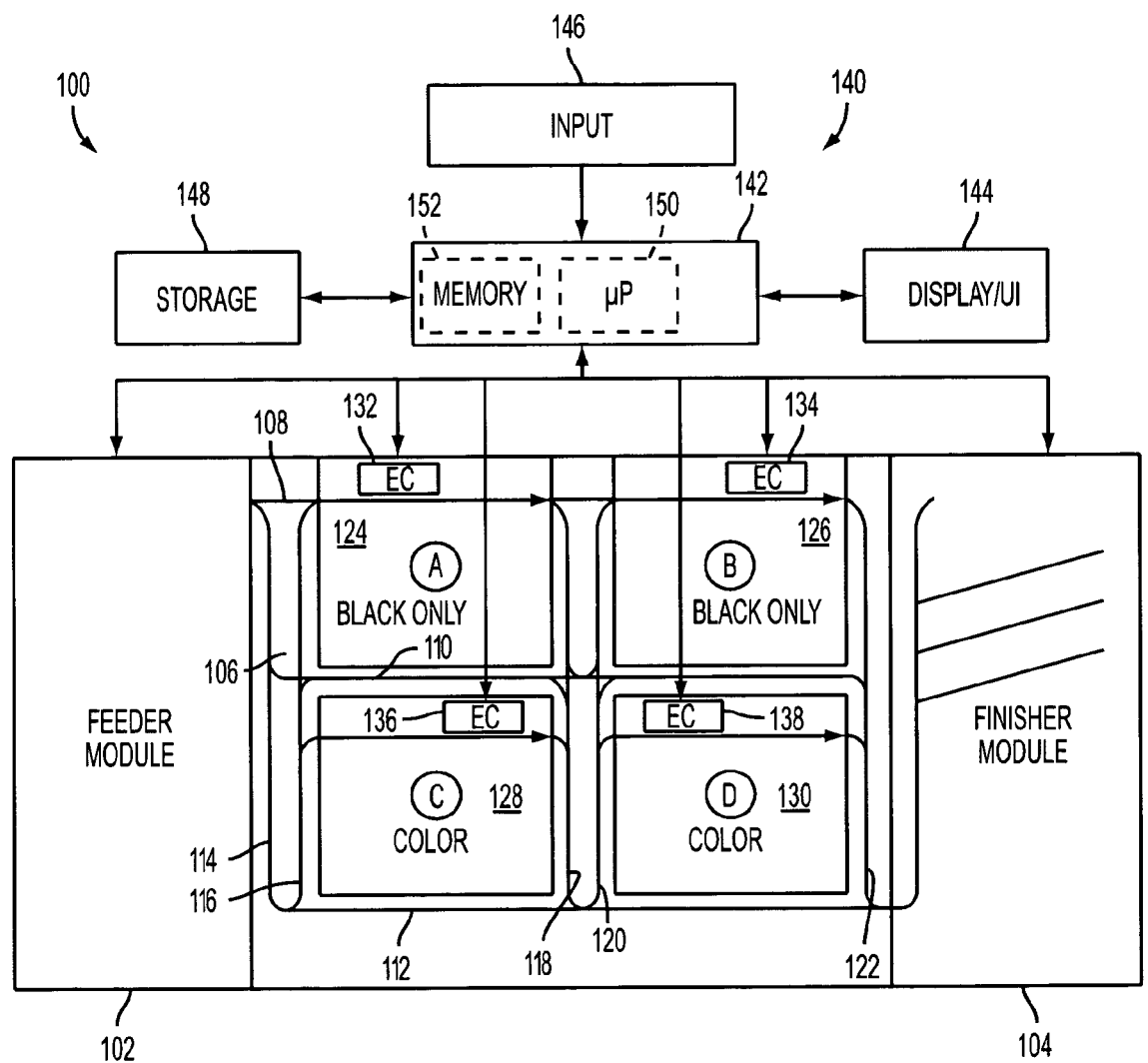
FIG. 1 is a side view of one example of a known multi-engine marking system.

The terms "printing" and "marking" as used herein are to be broadly interpreted to encompass an action or activity regarding the output or production of a sheet of media having text, images, graphics or other indicia formed thereon, alone or in any combination.

Similarly, the terms "print," "printer," "printing engine," "printing system," "marking engine" and "marking system" as used herein are to be broadly interpreted to encompass any apparatus that outputs a sheet of media having text, images, graphics and/or other indicia formed thereon, alone or in any combination.

Additionally, such text, images, graphics and/or other output indicia can be formed on sheet media of any type or form, such as paper or polymeric film, for example. Furthermore, such text, images, graphics and/or other output indicia can be formed using any printing or marking substance, such as ink, toner or colorant, for example, in monochrome (e.g. black) or one or more colors, or any combination thereof.

What's more, the term "logic circuit," "logical circuitry" and/or other similar terms as used herein are to be interpreted broadly to encompass any system, apparatus, process and/or algorithm that is capable of processing inputs and returning a result or output. For example, these can include, without limitation, discrete electrical or electronic circuitry, electronic components, processors or other hardware, firmware, software, or any combination the foregoing.

Also, it will be appreciated that a printing system can include any suitable number of marking engines, as has been discussed above. For convenience and ease of reading and understanding, the printing system will be referred to as having a number $N_X$ of marking engines with individual marking engines being referred to by the designation $ME_X$, wherein X can be any number from one (1) to $N_X$. Similarly, it will be appreciated that a given marking engine $ME_X$ can have associated with it any number of operational metrics. For convenience and ease of reading and understanding, any given marking engine $ME_X$ will be referred to as having a number $N_A$ of associated metrics $M_A$, wherein A can be any number from one (1) to $N_A$. Alternately, the associated metrics may be referred to as $M_{XA}$, wherein X makes reference to the corresponding marking engine.

Furthermore, it will be appreciated that a printing system can process any suitable number of print jobs over the course of a period of operation, and that any number of such print jobs may be in queue for release to the one or more marking engines at any one time. For convenience and ease of reading and understanding, the printing system will be referred to as having a number $N_Y$ of pending print jobs J in queue with specific reference being made to any one print job under the designation $J_Y$, wherein Y can be any number from one (1) to $N_Y$. Also, as will be discussed in detail hereinafter, printing systems having multiple marking engines can often run or otherwise produce any one print job in a number of ways, depending upon the redundant capabilities of the printing system. For convenience and ease of reading and understanding, it will be appreciated that any given print job can be run by a printing system in a number $N_Z$ of ways W and that reference is made to any one way under the designation $W_Z$, wherein Z can be any number from one (1) to $N_Z$.

FIG. 1 illustrates an exemplary marking system 100 that includes a media input or feeder module 102 and a media output or finisher module 104. A media pathway 106 extends between the media input and the media output. Media pathway 106 includes a first or upper highway 108, a second or intermediate highway 110 and a third or lower highway 112. The highways are interconnected by vertical pathways 114, 116, 118, 120 and 122. Marking system 100 also includes marking engines 124, 126, 128 and 130. In the embodiment shown in FIG. 1, marking engines 124 and 126 are indicated as being monochrome (e.g. black) marking engines, and marking engines 128 and 130 are indicated as being color (e.g. cyan, magenta, yellow and black) marking engines. The marking engines are interconnected with highways and/or vertical pathways in a conventional manner.

It will be appreciated that marking engines 124-130 are of a generally typical construction and function in a manner consistent with known xerographic principles of operation. The marking engines respectively include engine controllers 132, 134, 136 and 138 that are in operative association with typical components of the marking engine, such as a charging component or system, an exposure component or system, a developer component or system, a transfer component or system, a photoreceptor cleaning component or system and/or a fuser component or system, for example.

Marking system 100 also includes a control system 140 that coordinates operation of the various systems and/or components of marking system 100. Control system 140 includes an electronic control unit or supervisory controller 142 and a user interface 144 in communication with supervisory controller 142. Additionally, control system 140 includes an input interface 146 and a storage device 148, each of which is in communication with supervisory controller 142. Input interface 146 can include and/or be in communication with any suitable input devices or systems for delivering print jobs and/or data associated therewith to marking system 100 through supervisory controller 142. Exemplary input devices and/or systems can include image scanning devices, memory card readers, stand-alone computers and/or computer networks. Storage device 148 receives print jobs and/or data associated therewith from supervisory controller 142 and stores the same in queue prior to being released for production as printed documents.

Supervisory controller 142 is in communication with feeder module 102, finisher module 104 and engine controllers 132-138 and, thus, is typically responsible for releasing queued print jobs from the storage device and routing the same through the pathways, marking engines and other components of the marking system to produce the printed documents. In addition to sending instructions to the other components and systems, supervisory controller 142 can receive instructions, data and other signals from the other systems and components, such as engine controllers 132-138, for example, as well as also perform other functions, such as evaluating print jobs queued for release and organizing or otherwise re-ordering the queued print jobs as may be desired. Thus, supervisory controller 142 can include logical circuitry in any suitable form or configuration for attending to and controlling any or all of such actions and others. In the exemplary embodiment shown in FIG. 1, supervisory controller 142 includes a processing device, such as a microprocessor 150, for example, and a memory device, such as non-volatile or random access memory 152, for example. Additionally, in one exemplary embodiment, the logical circuitry can take the form of a software program that is stored in a suitable memory device, such as storage device 148 or memory 152, for example, and is executed by a suitable processing device, such as microprocessor 150, for example. However, it is to be understood that other arrangements could alternately be used.

It is to be specifically understood that marking system 100 shown in and discussed with regard to FIG. 1 is merely exemplary of one suitable marking system and that any other printing system of any kind, type or configuration could alternately be used. For example, any number of marking engines could be used, such as from one to twenty marking engines, for example, in association with any arrangement of complimentary media pathways. As another example, the one or more marking engines could be all monochrome, all color or any combination of monochrome and color marking engines in any arrangement or configuration. As a further example, the marking system could optionally include one or more redundant elements, such as fusers separate from the marking engines that are accessible via the highway and vertical media pathways, for example. These could either be used in shared fashion or added to the redundancies of the system.

Both printing systems overall as well as the individual marking engines thereof will typically have one or more metrics associated therewith, and most often a substantial number of metrics will be associate with each. The term "metric" as used herein is to be interpreted broadly to encompass any measurable, monitorable or otherwise determinable condition, state, status, parameter or other characteristic associated with a printing system or component thereof. Metrics are often associated with printing system or marking engine inputs, features, performance parameters and other operational aspects thereof. Most commonly, however, a metric will be associated with a status or operational condition of a component of a marking engine. However, it will be appreciated that in other circumstances, the metric could be associated with the status or conditions of the printing system or marking engine itself.

Some specific examples of metrics associated with a component of a marking engine can include: the amount of toner in a toner cartridge; the number of cycles experienced by a photoreceptor or photoreceptor cartridge; the degree or advancement of the cleaner/oiler web in a fuser or fuser cartridge; the number of sheets of media passing through a fuser or fuser cartridge; the volume of air passing through a replaceable filter; the number of sheets of media passing through replaceable paper path elements; the number of sheets of paper passing through a transfer nip utilizing a replaceable bias roll or transfer belt; the kilometers of photoreceptor travel for a replaceable cleaner blade or brush. Some specific examples of metrics associated with a marking engine or printing system overall can include: the status or available quantity of feeder supplies, such as media of various sizes, types and/or kinds; status or available quantity of finisher supplies, such as staples or binder tape; and media pathway status. With regard to the latter, the state of the highway or vertical pathway at the approach to an engine can be used as a metric. Thus, if there is a paper jam in this area and the engine is not accessible, suitable actions can be taken or decisions can be made based upon the value of this metric. It will be appreciated that one skilled in the art will recognize a wide variety of other metrics that could alternately or additionally be used. Furthermore, the skilled artisan will recognize that a value for the metrics can be determined, estimated, calculated or otherwise established in any suitable manner.

Normally, components of a printing system and/or marking engine have a definable or expected life, and use of a component beyond the defined life typically results in a reduction in performance, a degradation of image quality and/or other undesirable characteristics or occurrences. What's more, not all components have the same impact on performance, image quality and/or other characteristics, so some metrics may be more frequently monitored by a printing system or marking engine whereas others may only be checked periodically, such as during a calibration or diagnostic operation, for example. In many systems, however, it is possible for either the engine controller or supervisory controller to access a signal, data or another indicator representative of the status of a given metric of a component or system. Typically, this is accomplished without the need for additional sensor, electronic connections or other components or arrangements. Thus, it will be appreciated that some metrics could be available on one type or kind of printing system, whereas other, different metrics could be available on other printing systems. The exemplary method, however, is capable of utilizing whichever metrics are available or ascertainable on a given printing system. Additionally, it will be appreciated that it may not be desirable to utilize all of the metrics that are available or ascertainable. Thus, a lesser number of selected metrics can be used.

It will be appreciated that some metrics are readily determinable, such as by direct signal values, for example. With other metrics, however, direct measurement of the status, use or reduction of capability of an associated component may not be possible. In such cases, it may be possible to use one or more indirect measurements to establish an actual or estimated value or level for the metric. For example, a direct measurement of the amount of toner remaining in a toner cartridge or, alternatively, a direct measurement of the quantity of toner that has been used from a toner cartridge may be unavailable. In such case, the toner that has been used could be approximated by correlating the image pixels processed by the development unit associated with the subject toner cartridge. An alternate approach could be to correlate the number of revolutions of the associated toner delivery auger with a toner usage value. In the end, there will often be a way to determine the status of a given metric without the addition of sensors or other electronics.

Figure 2:
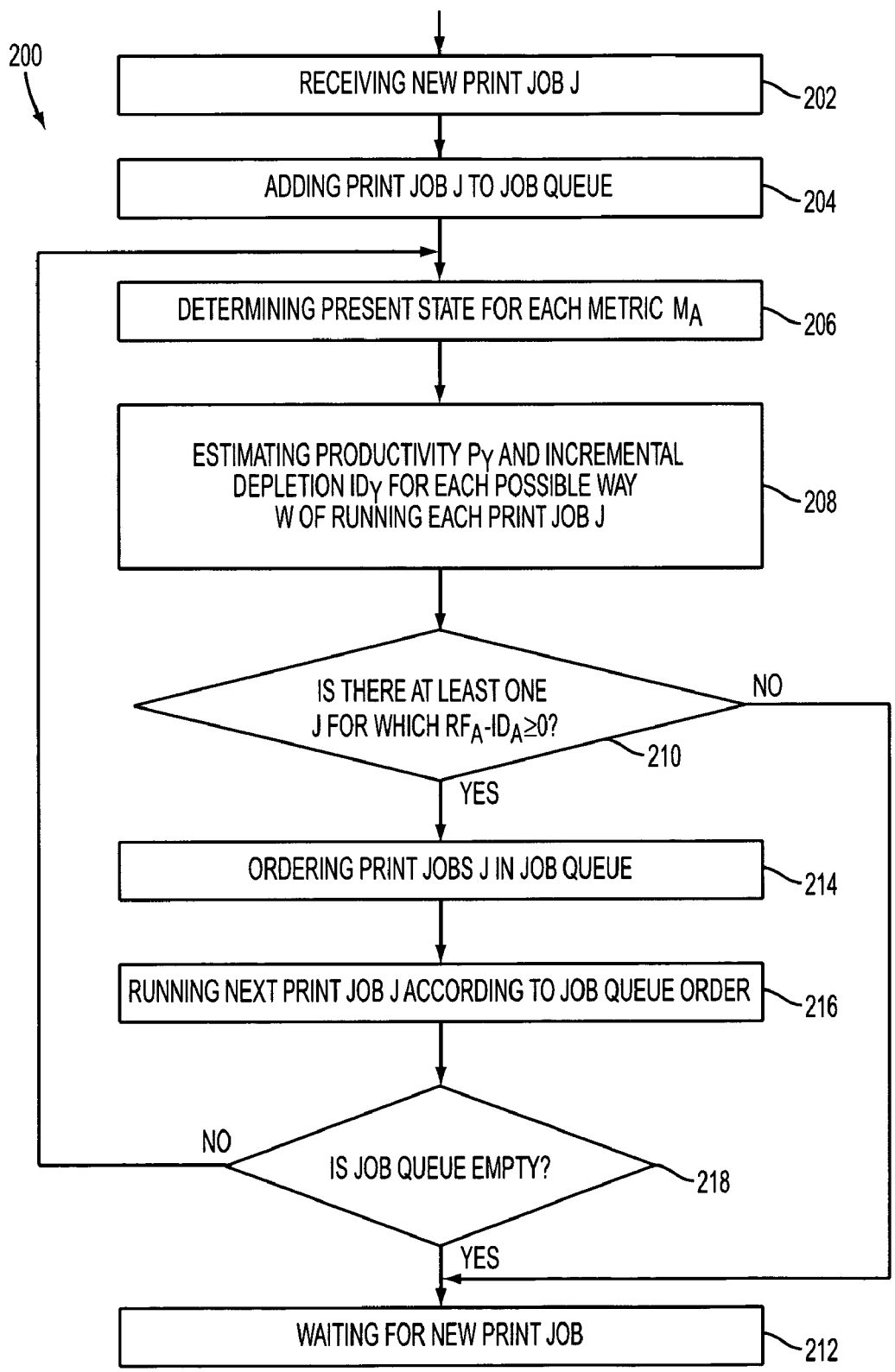
FIG. 2 is a flowchart illustrating one exemplary method of ordering a job queue.

FIG. 2 is a flowchart illustrating one exemplary method 200 of ordering a job queue of a printing system, such as system 100, for example. Method 200 includes item 202 of receiving a new print job $J_Y$ and item 204 of adding the print job to the plurality of print jobs J in the job queue. As an example, a print job could be received by marking system 100 through input interface 146 and stored as a queued print job in storage device 148. Method 200 also includes item 206 of determining a present state of the printing system. In one exemplary embodiment, this can include determining a remaining function value $RF_A$ for each metric $M_A$ of the $N_A$ metrics associated with the printing system, its marking engines and/or the components thereof. In systems having more than one marking engine, another exemplary embodiment of item 206 can include determining a remaining function value $RF_{XA}$ for each metric $M_{XA}$ for each of the one (1) to $N_X$ marking engines $ME_X$. Item 208 includes estimating a productivity value P for a print job and an incremental depletion value $ID_A$ of each of a plurality of pre-selected metrics $M_A$ for the print job. In systems having more than one marking engine, it may be possible to run or otherwise produce the print job in more than one way by utilizing the redundant capabilities of the multiple marking engines. In such systems, item 208 can include estimating a productivity value $P_Z$ and an incremental depletion value $ID_{ZA}$ for one or more of the one (1) to $N_Z$ ways $W_Z$ of running the print job.

Method 200 makes an inquiry at item 210 that includes determining if there is at least one print job $J_Y$ of print jobs J in the job queue that the marking engine has the capabilities to produce. Said differently, item 210 determines whether, for each of the selected metrics $M_A$, remaining function $RF_A$ of a given metric $M_A$ is greater than incremental depletion $ID_A$ of that metric due to the corresponding print job. If a NO determination is returned in item 210, method 200 proceeds to item 212 and waits for a new print job to be received and added to the job queue in items 202 and 204, respectively. At which point, method 200 can be repeated to determine whether or not the printing system has the capabilities to produce the newly added print job or jobs. If a YES determination is returned in item 210, the method proceeds to item 214 which includes ordering the print jobs in the job queue. Ordering the print jobs in the job queue can be based upon any suitable factors and/or criteria, as will be discussed in more specific detail hereinafter.

Method 200 further includes item 216 of running the next print job in the job queue according to the order established in item 214. Method 200 makes an inquiry at item 218 that includes determining whether the job queue is empty. If a YES determination is returned, method 200 proceeds to item 212 and waits for a new print job to be received and added to the job queue. If a NO determination is returned in item 218, method 200 returns to item 206 and repeats the foregoing until a NO determination is returned in item 210 or a YES determination is returned in item 218.

Figure 3:
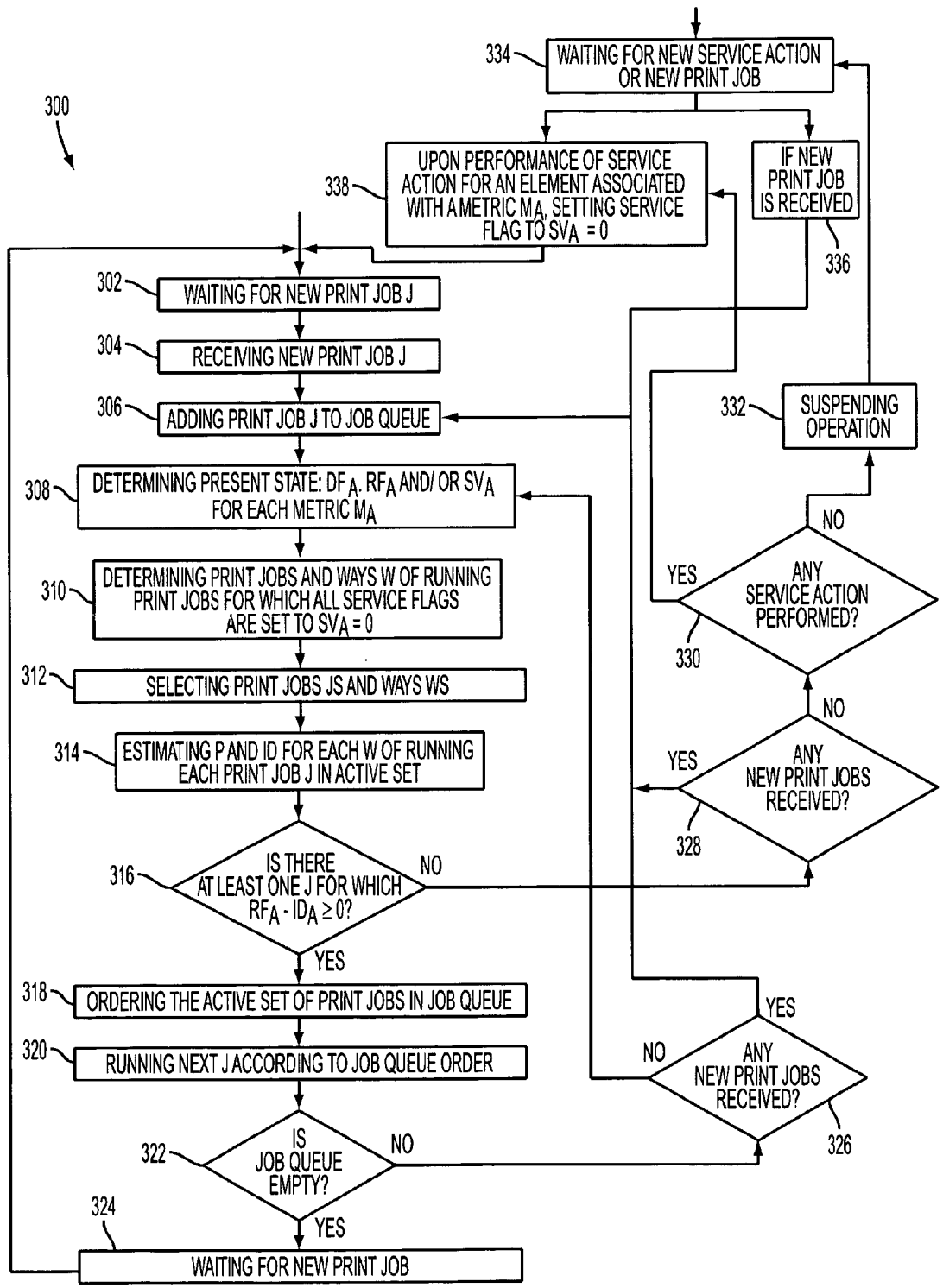
FIG. 3 is a flowchart illustrating another exemplary method of ordering a job queue.

FIG. 3 is a flowchart illustrating another exemplary embodiment of a method 300 of ordering a job queue of a printing system, such as system 100, for example. Method 300 includes item 302 in which a printing system is waiting for a new print job. Examples of such a situation could include when the printing system has recently been started or re-started, when the printing system is unable to run any of the print jobs currently in the job queue, or when the job queue is empty. Item 304 includes receiving a new print job $J_Y$ and item 306 includes adding the new print job to print jobs J pending in the job queue.

Method 300 also includes item 308 of determining the present state of the printing system. In one exemplary embodiment, this can include determining a depleted function value $DF_A$, a remaining function value $RF_A$ and/or a service flag value $SV_A$ for each selected metric $M_A$ of a printing system or marking engine. In systems having more than one marking engine, item 308 can include determining a depleted function value $DF_{XA}$, a remaining function value $RF_{XA}$ and/or a service flag value $SV_{XA}$ for each selected metric $M_{XA}$ of each of the one (1) to $N_X$ marking engines $ME_X$. Method 300 further includes item 310 of determining which print job or jobs $J_Y$ of pending print jobs J in the job queue and the alternative ways W of running such print jobs $J_Y$ can be produced or run without utilizing any components or systems associated with a metric that is flagged for service, and optional item 312 includes selecting one or more of print jobs $J_Y$ from the pending print jobs J in the job queue to form selected print jobs JS together with the associated ways WS of running the print jobs without utilizing any components or systems associated with a metric that is flagged for service.

Method 300 further includes item 314 of estimating a productivity value P and an incremental depletion value $ID_A$ for each of a plurality of pre-selected metrics $M_A$ for each of the selected print jobs $JS_Y$. In systems that include more than one marking engine, it may be possible to run or otherwise produce the print job in more than one way by utilizing the redundant capabilities of the multiple marking engines. In such systems, item 314 can include estimating a productivity value $P_Z$ and an incremental depletion value $ID_{ZA}$ for each of selected metrics $M_A$ of one or more of the one (1) to $N_Z$ ways $W_Z$ of running a given selected print job $JS_Y$.

Method 300 makes an inquiry at item 316 that includes determining if at least one of selected print jobs JS can be produced based upon the current capabilities of the printing system. Said differently, item 316 determines whether remaining function value $RF_A$ of a given metric $M_A$ is greater than estimated incremental depletion value $ID_A$ of that metric should the corresponding print job be run. In systems that include a plurality of marking engines, it may be possible to run or otherwise produce a given print job in one (1) to $N_Z$ ways $W_Z$, as mentioned above. In such systems, item 316 includes determining whether remaining function value $RF_{XA}$ of a given metric $M_{XA}$ is greater than estimated incremental depletion value $ID_{ZA}$ of that metric if the corresponding print job were run according to way $W_Z$. This determination is repeated for each of the one (1) to $N_Z$ ways $W_Z$ of running each print job. If a YES determination is reached in item 316, method 300 proceeds to items 318 which includes ordering selected print jobs JS and item 320 which includes running one or more of the selected print jobs according to the order established in item 318.

Method 300 makes an inquiry at item 322 that includes determining whether the job queue is empty. If a YES determination is reached, method 300 proceeds to item 324 which returns to a point above item 302 to wait for a new print job to be received. If a NO determination is returned in item 322, method 300 proceeds to item 326 and makes an inquiry as to whether any new print jobs have been received. If a YES determination is returned in item 326, method 300 proceeds to item 306 to add the new print job or jobs to the print queue. If a NO determination is returned in item 326, method 300 proceeds to item 308 of determining the present state of the printing system.

Returning to item 316, if a NO determination is returned then method 300 proceeds to item 328 and inquires as to whether any new print jobs have been received. If a YES determination is returned, method 300 proceeds to item 306 to add the new print job or jobs to the print queue. The remaining items of the method can then be repeated, as the new print job or jobs may be capable of production even though other pending jobs are not. If a NO determination is returned in item 328, method 300 proceeds to item 330 and inquires as to whether any service, repair or maintenance actions have been performed. If a NO determination is returned in item 330, method 300 proceeds to item 332 suspending operation and item 334 in which the printing system is waiting for a new service action or a new print job. If a new print job is received at item 336, method 300 proceeds to item 306 thereby adding the new print job to the job queue. If a YES determination is returned in item 330 or if a service action is performed while waiting in item 334, method 300 proceeds to item 336 in which a service, repair or maintenance action is performed. In one exemplary embodiment, the service action will return the printing system to full capabilities and any service flags $SV_X$ associated with a metric of a serviced component or element are returned to an OFF or "0" value. With the printing system returned to full or approximately full capabilities, method 300 is returned again to item 302 and the method can be repeated, as desired.

Figure 4:
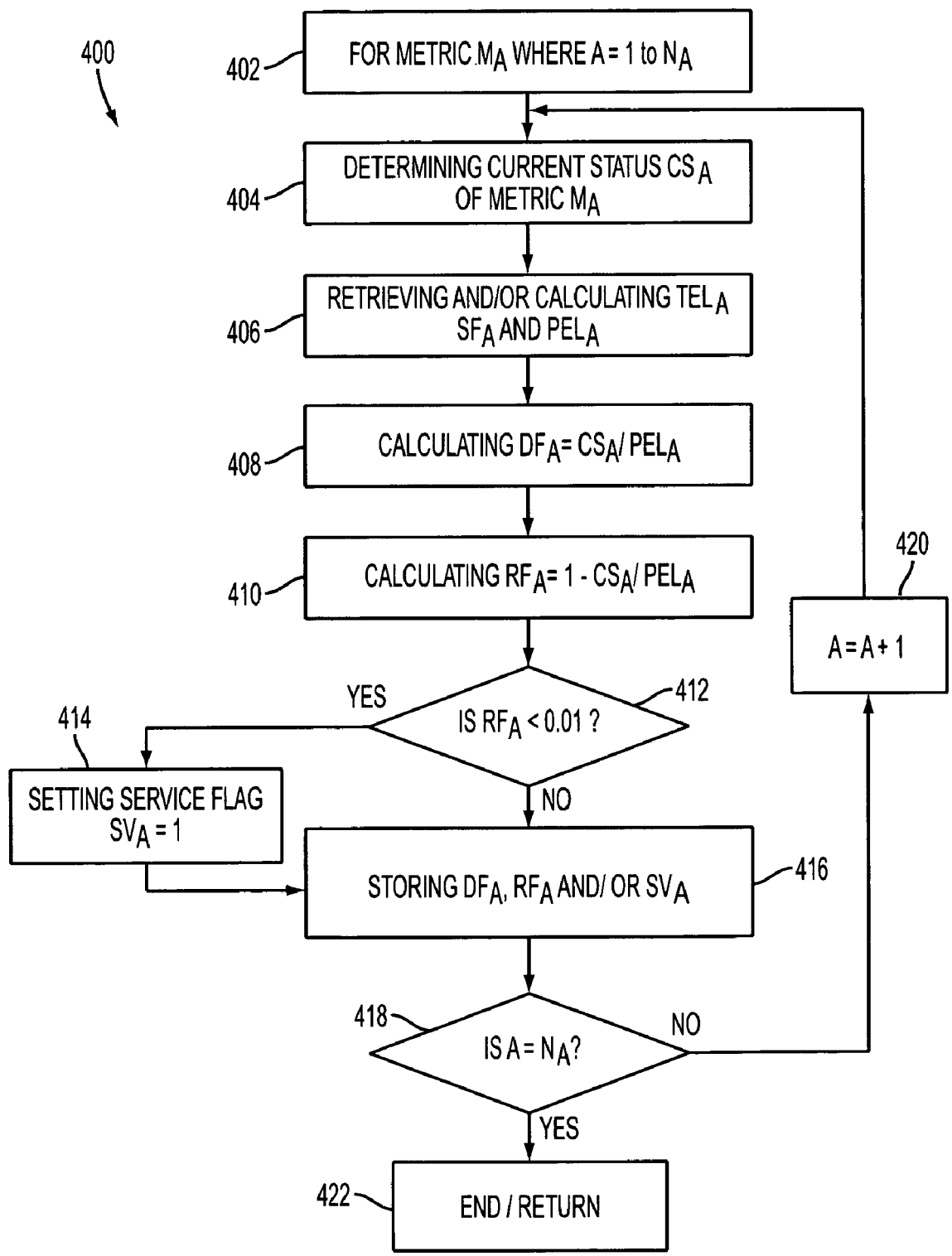
FIG. 4 is a flowchart illustrating one exemplary method of determining a present state of a marking system.

FIG. 4 is a flowchart illustrating one exemplary method 400 of determining a present state of a printing system, such as system 100, for example. In one exemplary embodiment, method 400 includes item 402 indicating that the method is repeated for each of from one (1) to $N_A$ metrics $M_A$ associated with a marking engine. Method 400 includes item 404 of determining a current status value $CS_A$ of a metric $M_A$ for the marking engine. Method 400 also includes item 406 of retrieving and/or calculating a theoretical end-of-life value $TEL_A$, a safety factor $SF_A$ and practical end-of-life value $PEL_A$ from a suitable memory or storage device for metric $M_A$. In one exemplary embodiment, the theoretical and practical end-of-life values are digitally stored in a look-up table. Alternately, a suitable multiplier, such as safety factor $SF_A$, for example, could alternately be retrieved instead of the practical end-of-life value, and the practical end-of-life later calculated using the multiplier. It will be appreciated, however, that any other suitable arrangement or calculation for determining the remaining or useful life of a component or metric can be used.

The theoretical end of life value as used herein represents a theoretical point at which the subject component is no longer capable of performing at the expected level. It has been recognized, however, that under some conditions it may be undesirable to actually use a product, system or component to the point at which the theoretical end-of-life is reached. For example, this may be because it is difficult to determine exactly when the theoretical end-of-life is reached under field use conditions or because the actual end-of-life condition can vary significantly due to manufacturing variations, or for other reasons. Due to such concerns and others, the practical end-of-life value can optionally be determined. In one exemplary embodiment, the practical end-of-life value will be sufficiently close to the theoretical end-of-life to minimize any unused capabilities of the component, but also sufficiently spaced from the theoretical end-of-life value to minimize occurrences of unexpected actual end-of-life conditions during operation. The practical end-of-life value can be provided in any suitable manner, including being calculated as a percentage of the total life or theoretical end-of-life value of the metric or as a predetermined value independent of the total life or theoretical end-of-life value. As a more specific example, the practical end-of-life value can be calculated as a percentage of the theoretical end-of-life, with the percentage difference acting as a safety factor $SF_A$ to minimize occurrences of premature failure. It will be appreciated that the determination of an actual end-of-life condition will be easier and/or more accurately predicted with some components, elements or metrics than with others. As such, the safety factor can, and likely will, be different for the various components, elements or metrics of a marking system and/or the marking engines thereof. For example, it may be that the actual end-of-life of a toner cartridge is known from experience to regularly and reliably occur at a point very near the theoretical end-of-life value, whereas the useful end-of-life of a filter or filter element is less reliably predicted. In such situations, the safety factor used for determining the practical end-of-life of the toner cartridge might be 0.9, but the safety factor for determining the practical end-of-life for the filter or filter element could be 0.5, for example. Thus, any suitable safety factor can be used, such as from approximately 0.1 to about 0.99, for example.

Method 400 further includes optional item 408 of calculating a normalized depletion of function value $DF_A$ and item 410 of calculating a normalized remaining function value $RF_A$. Method 400 makes an inquiry at item 412 as to whether the remaining function value $RF_A$ is less than a predetermined value at or sufficiently close to zero (0), such as a value of from approximately 0.01 to approximately 0.10, for example. It will be appreciated, however, that any suitable predetermined value at or close to zero can be used. If a YES determination is returned, then metric $M_A$ will have reached its practical end-of-life and method 400 proceeds to item 414 of setting service flag $SV_A$ to an ON or "1" value. Method 400 then proceeds to item 416 of storing the depletion of function value, the remaining function value and/or the service flag value for the present metric. If a NO determination is made in item 412, method 400 proceeds to item 416 of storing the depletion of function value, remaining function value and/or service flag value. This is done without first setting the service flag in item 414. Thus, the service flag remains at an OFF or "0" value. Method 400 makes an inquiry at item 418 as to whether all of the metrics associated with a given marking engine have been calculated and stored. If a NO determination is returned, method 400 proceeds to item 420 which repeats the method for the next metric. If a YES determination is returned, then all of the metrics of the given marking engine have been calculated and stored and method 400 proceeds to item 422 which ends the method or returns to a higher level routine. In a printing system that includes a plurality of marking engines, method 400 can be repeated for each marking engine of the plurality of marking engines.

Figure 5:
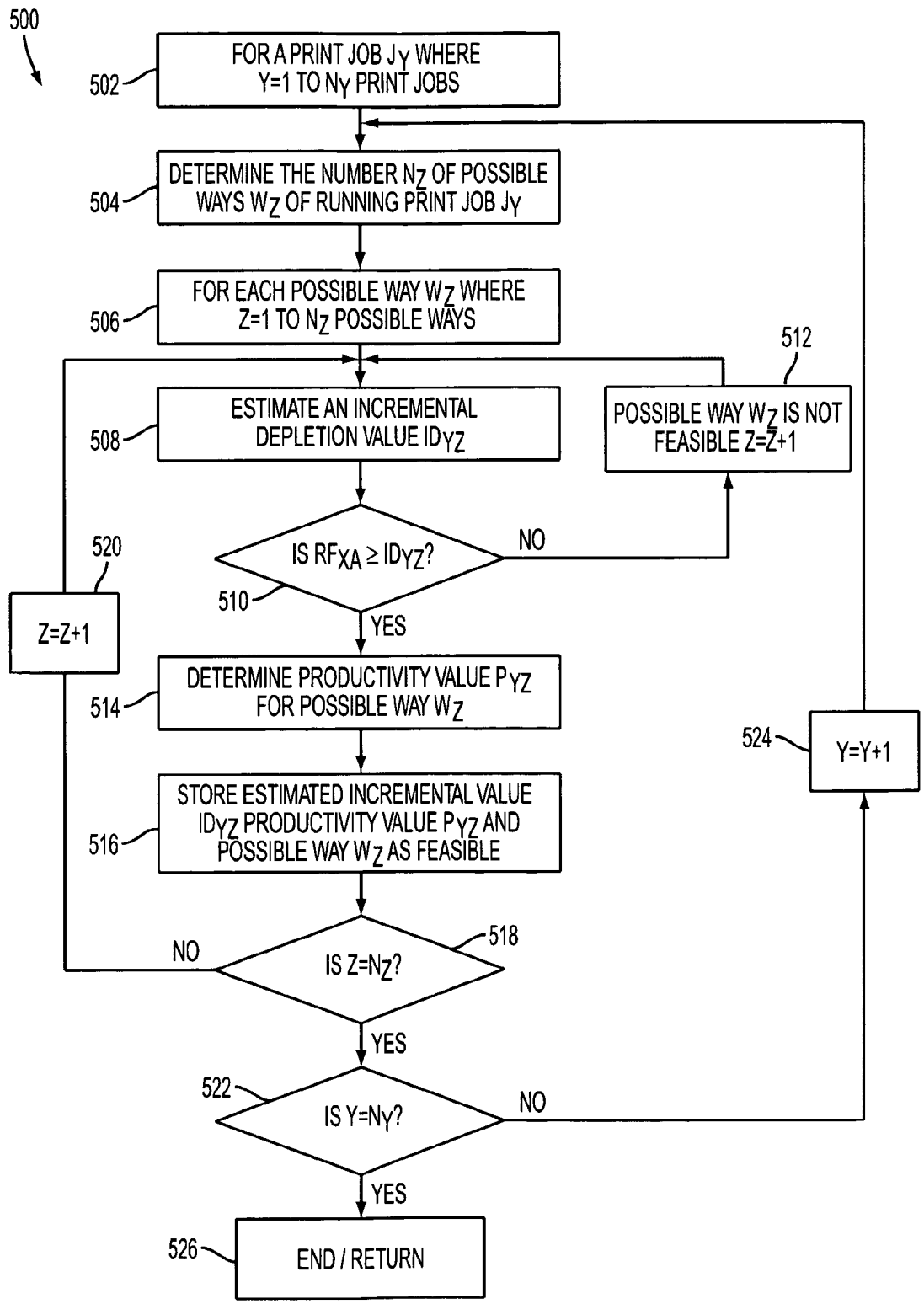
FIG. 5 is a flowchart illustrating one exemplary method of estimating incremental depletion and productivity values for print jobs in a job queue.

FIG. 5 is a flowchart illustrating one exemplary method 500 of determining an incremental depletion value $ID_A$ for a metric $M_A$ of a print job $J_Y$ and a productivity value $P_Y$ of the print job. Typically, a print job queue of a printing system, such as system 100, for example, will have numerous print jobs pending at any given time. For the purposes of this exemplary embodiment of method 500, each of the pending print jobs will be processed individually, as indicated by item 502 in which the job queue includes a print job $J_Y$ in which Y represents from one (1) to $N_Y$ print jobs. Additionally, it will be appreciated that for the purposes of discussing this exemplary embodiment of method 500, the associated printing system includes a plurality of marking engines. As such, each print job may be capable of being run or otherwise produced in more than one way.

Accordingly, method 500 includes item 504 of determining the number $N_Z$ of possible ways $W_Z$ of running print job $J_Y$. Such a determination can be made in any suitable manner. For example, the marking system could include a data set of redundant elements of the system, which could be stored in a suitable storage device, such as a non-volatile memory, for example. It will be appreciated that any given print job is processed by a printing system in the same general way and according to the same general principles. That is, in processing a print job, image information gets sent to an imager and a photoreceptor, which is usually the heart of the printing engine, is selected. Thus, selecting the photoreceptor is generally the same as selecting the engine, though it will be appreciated that some color engines include more than one photoreceptor. A charger is activated to charge the photoreceptor and an imager is used to selectively discharge the photoreceptor. Toner is dispensed and used to develop the image. A sheet is fed to the transfer zone of the appropriate photoreceptor and the image is transferred to the sheet. The sheet is then sent to a fuser and fuser oil is metered or applied to the fuser roll. Finally, the fused sheet is either returned to an engine if duplex, or else directed to an output device. In the case of duplex, the sheet could be returned to the same photoreceptor/engine, or to a redundant engine.

It will be appreciated, however, that, in this sequence, there may be redundant photoreceptors (usually at the core of an engine), redundant toner cartridge sources for the toner dispense to the development housing, redundant fusers, redundant containers/cartridges for the fuser oil, and/or any other of a wide variety of other redundant components. These redundancies could be captured in an array of values in a suitable storage device, such as the non-volatile memory, for example, which could be updated from time to time as the system elements are changed to add (or remove) redundant elements, for example.

A loop is established at item 506 in which each of the number $N_Z$ of possible ways $W_Z$ of running print job $J_Y$ is evaluated to determine if the possible way is an actual feasible way of running the print job. Item 508 includes estimating an incremental depletion value $ID_{YZ}$ for way $W_Z$ of processing print job $J_Y$. The incremental depletion value can be estimated in any suitable manner. For example, the number of cycles or rotations of the drum might be used as a metric for depletion of a photoreceptor. So, if the photoreceptor has end of life approximately N cycles, and it is estimated that n cycles are required for the present job, then the incremental depletion value could be determined as n/N, for example. As another example, the life of a cleaning blade could be established as a number of miles or kilometers of photoreceptor belt or drum surface that have traveled past the cleaning blade. The number of miles or kilometers of travel will correspond to a number of cycles of the photoreceptor. This can be related to the number of pages of a given print job, as discussed above, to estimate the incremental depletion of the print job.

Method 500 makes an inquiry at item 510 of whether remaining function value $RF_{XA}$ for metric $M_A$ of marking engine $ME_X$ is greater than or equal to incremental depletion value $ID_{YZ}$ for the same metric of the same marking engine. If a NO determination is made at item 510, method 500 proceeds to item 512 which indicates that way $W_Z$ that is being evaluated is not a feasible way of processing print job $P_Y$. Item 512 can also establish that the next way of processing print job $J_Y$ is to be evaluated and returns to item 508 to estimate the next incremental depletion value of the next way. If a YES determination is made at item 510, then way $W_Z$ is a feasible way of processing print job $J_Y$ and the method proceeds to item 514 to determine a productivity value $P_{YZ}$ for this feasible way $W_Z$ of processing print job $J_Y$. Method 500 further includes item 516 of storing incremental depletion value $ID_{YZ}$, productivity value $P_{YZ}$ and that way $W_Z$ is a feasible way of processing print job $J_Y$.

Productivity can be determined in any suitable manner, such as by estimating the overall time to process the job, for example. Estimating the overall time to process the print job can include a calculation of paper transit times, an estimation of the time for the required number of photoreceptor revolutions, determining a time for sheet feed, calculating a time for output processes, and/or estimating cycle-up and cycle-out times, for example. It will be appreciated, however, that the foregoing is but one measure of productivity, and that any of the foregoing or other measures of productivity alone or in combination could be used. Furthermore, it will generally be recognized that the shorter the time, the better the productivity.

The following example illustrates the different productivities associated with two ways of running a duplex print job using a printing system having two or more marking engines. In the first way, the first marking engine is used to print the first side of the duplex print job. The sheet(s) are then transported back to the inlet of the same marking engine, inverted and then printed on the second side. In the second way, the first marking engine is used to print the first side of the duplex sheet(s). The sheets are then fed directly into the second marking engine (and possibly inverted) to print the second side of the duplex sheet(s). It will be appreciated that the latter process could significantly reduce the transfer time of the sheet(s), resulting in a higher productivity.

Method 500 makes an inquiry at item 518 as to whether each way $W_Z$ of running print job $J_Y$ has been evaluated. If a NO determination is returned at item 518, method 500 proceeds to item 520 which establishes that the next way of processing print job $J_Y$ is to be evaluated and returns to item 508 to estimate the next incremental depletion value of the next way. If a YES determination is returned at item 518, method 500 proceeds to item 522 which inquires as to whether all of print jobs $J_Y$ have been evaluated. If a NO determination is returned at item 522, method 500 proceeds to item 524 which establishes that the next print job is to be evaluated and returns to item 504. If a YES determination is returned at item 522, method 500 proceeds to item 526 which ends the method or returns to an upper level process.

Figure 6:
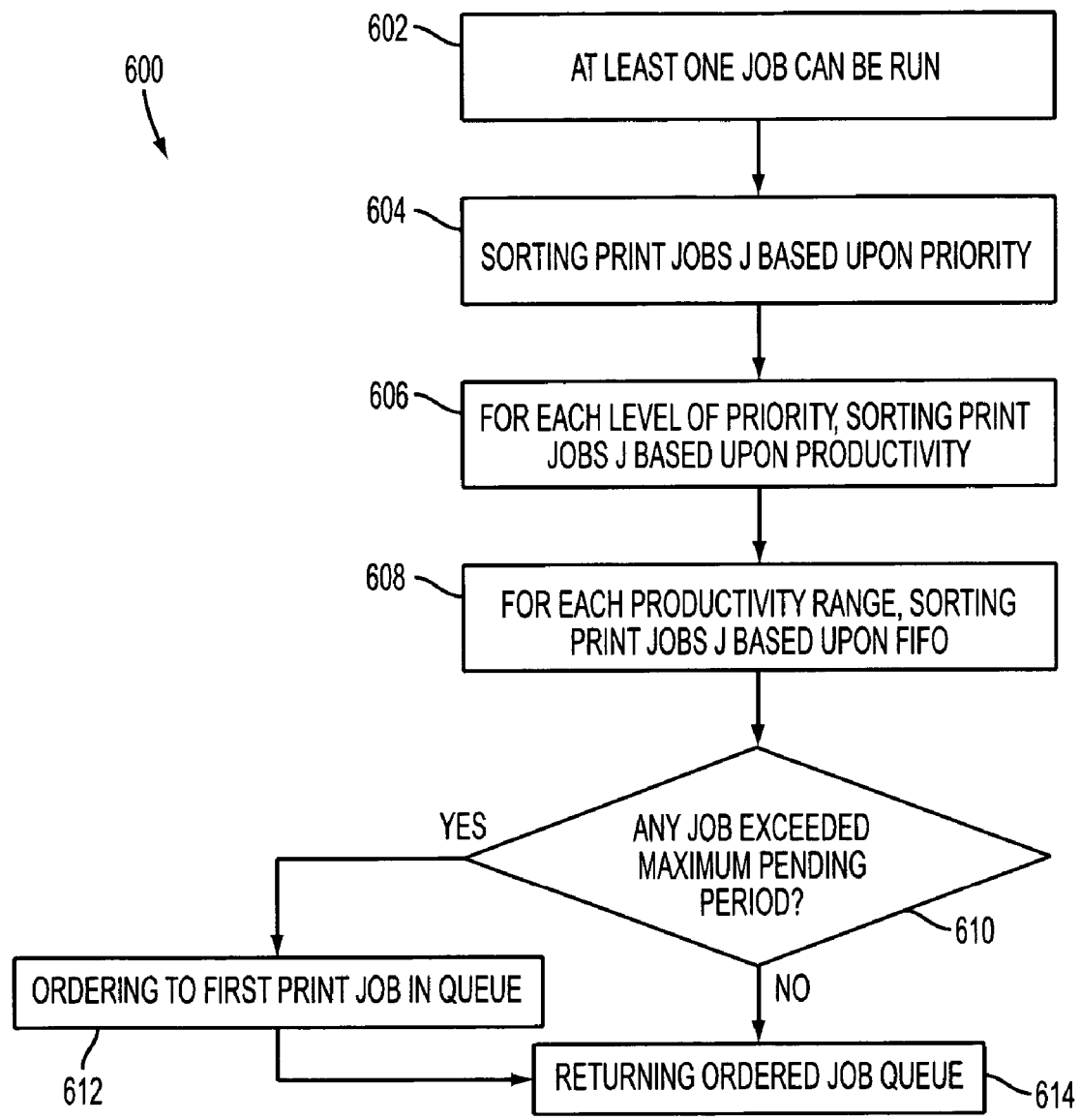
FIG. 6 is a flowchart illustrating one exemplary method of sorting print jobs in a job queue; and, FIG. 7 is a flowchart illustrating one exemplary method of recalibrating an end-of-life value.

FIG. 6 is a flowchart illustrating one exemplary method 600 of ordering a job queue. Method 600 includes item 602 establishing that at least one print job can be run. Item 604 includes sorting the at least one print job based upon a priority level, such as might be assigned by or associated with the party that sent the print job, for example. Item 606 includes sorting at least the print jobs belonging to the highest level of priority based upon a productivity level of the print jobs. This could include sorting by individual productivity values or alternately by separating print jobs by stratified layers of productivity ranges, for example. Item 608 includes sorting at least the print jobs belonging to the highest level of productivity based upon print job pendency, which could also be referred to as "first in, first out" sorting. Items 604-608 represent one example of a multi-level sort operation. However, it will be appreciated that a wide variety of other sorting criteria could alternately or additionally be used and that the sorting operation discussed above is merely exemplary of one suitable sorting operation.

Method 600 makes an inquiry at item 610 that includes determining whether any print job in the job queue has been pending for a period of time that exceeds a pre-determined maximum pending period. It will be appreciated that any suitable maximum pending period can be used, such as a fifteen minute period or a one hour period, for example. If a YES determination is returned, method 600 can re-order the print queue so that that print job is prioritized, such as by increasing its priority level or simply be elevating it to the first position in the print queue. Thereafter, method 600 proceeds to item 614 that returns the ordered print queue. If a NO determination is returned in item 610, method 600 proceeds to item 614 without promoting any print jobs for exceeding the maximum pending time. One or more of the print jobs can then be released from the ordered print queue for production by the printing system.

Figure 7:
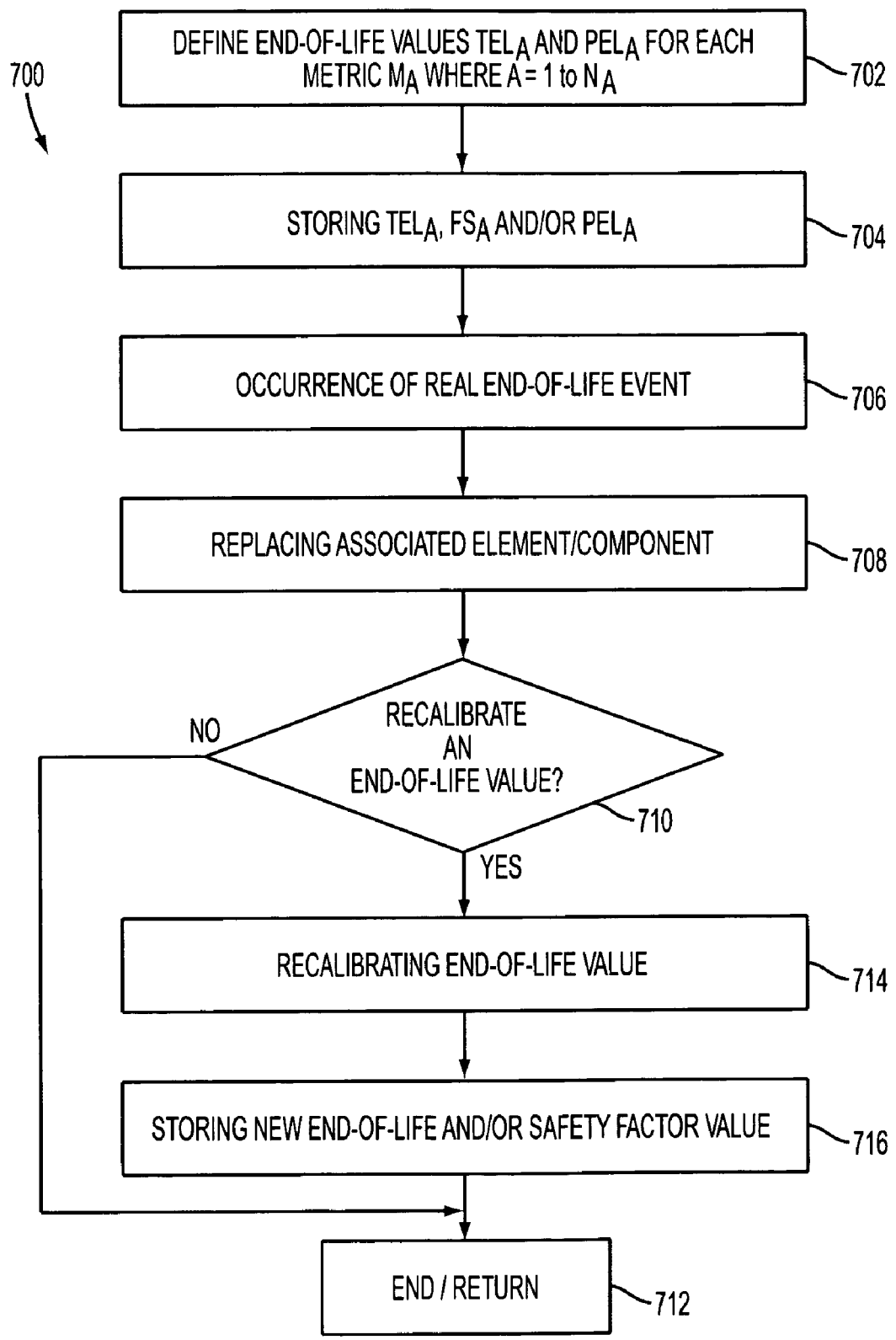

FIG. 7 is a flowchart illustrating one exemplary method 700 of recalibrating an end-of-life value based upon an actual end-of-life event. Method 700 includes item 702 that establishes theoretical end-of-life values $TEL_A$, safety factor $SF_A$ and/or practical end-of-life values $PEL_A$ for each metric $M_A$ of a plurality of metrics associated with the printing system. Method 700 also includes item 704 of storing values $TEL_A$, $SF_A$ and/or $PEL_A$ for each metric. Typically this will occur at an early stage in the life of the printing system, such as during manufacture or at installation or initial setup, for example. An occurrence of a real end-of-life event is indicated at item 706, such as the emptying of a toner cartridge or when a drum photoreceptor has reached the number of revolutions corresponding to the end of life condition, for example. In item 708, a user or service technician replaces the expired element or component that is associated with metric $M_A$. Method 700 makes an inquiry at item 710 as to whether a user or service technician will recalibrate one or both of the end-of-life values $TEL_A$, $SF_A$ and/or $PEL_A$ for each of the one or more metrics associated with the serviced component. If a NO determination is returned at item 710, method 700 proceeds to item 712 which ends the method or returns to an upper level process or method. If a YES determination is returned at item 710, method 700 proceeds to item 714 for recalibrating one or both of the end-of-life values $TEL_A$, $SF_A$ and/or $PEL_A$. This can be accomplished in any suitable manner, such as by using the results of an analysis of field data and/or other testing and/or the known characteristics of a newly designed part, which might suggests that new or updated values of the end of life are needed, for example. Once one or more of the end-of-life values have been recalibrated, method 700 proceeds to item 716 of storing the new end-of-life values. This can be performed in any suitable manner, such as by storing or updating digital values of a system template in a non-volatile memory, for example. After storing the new values, method 700 proceeds to item 712, discussed above.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of ordering a queue of print jobs of a marking system including a plurality of marking engines and an electronic control system with each of said plurality of marking engines having a plurality of metrics associated therewith, said method comprising:

determining, using said electronic control system, a present state value of at least one metric selected from said plurality of metrics of each marking engine, said action of determining a present state value including determining a practical end-of-life value for said at least one metric by calculating said practical end-of-life value, said action of calculating said practical end-of-life value including retrieving a theoretical end-of-life value and a multiplier from a memory and calculating said practical end-of-life value based at least in part on said theoretical end-of-life value and said multiplier;

estimating an incremental depletion value for said at least one selected metric for each print job;

comparing said incremental depletion value for said at least one selected metric of each print job with said present state value of said at least one selected metric of each marking engine; and, ordering said queue of print jobs based at least partially on said comparison.

2. A method according to claim 1, wherein said marking system includes a memory in communication with said controller, and determining a present state value of each metric of each marking engine includes storing said present state value in said memory.

3. A method according to claim 1, wherein determining a present state value of said at least one selected metric of each marking engine includes determining a remaining function value of said at least one selected metric of each marking engine.

4. A method according to claim 3 further comprising comparing said remaining function value with an approximately zero value, and setting a service flag if said remaining function value is one of less than and about equal to said approximately zero value.

5. A method according to claim 3, wherein comparing said incremental depletion value for said at least one selected metric of each print job includes determining whether said incremental depletion value for said at least one selected metric of each print job is one of less than or equal to said remaining function value of each marking engine.

6. A method according to claim 5 further comprising selecting one or more print jobs having an incremental depletion value that is one of less than or equal to said remaining function value from said queue of print jobs.

7. A method according to claim 1, wherein one or more print jobs of said queue of print jobs can be printed in two or more ways, and ordering said queue includes selecting a way from said two or more ways.

8. A method according to claim 7, wherein estimating an incremental depletion value for said at least one selected metric of each print job includes estimating an incremental depletion value for said at least one selected metric for each of said two or more ways of printing each print job.

9. A method according to claim 7, wherein comparing includes determining whether said incremental depletion value for said at least one selected metric for each of said two or more ways of printing each print job is one or less than or approximately equal to said depleted function value for said at least one selected metric of each marking engine.

* * * * *